March 27, 1962  L. B. McCOY  3,027,020
PALLET PACKER
Filed Dec. 16, 1958  5 Sheets-Sheet 2
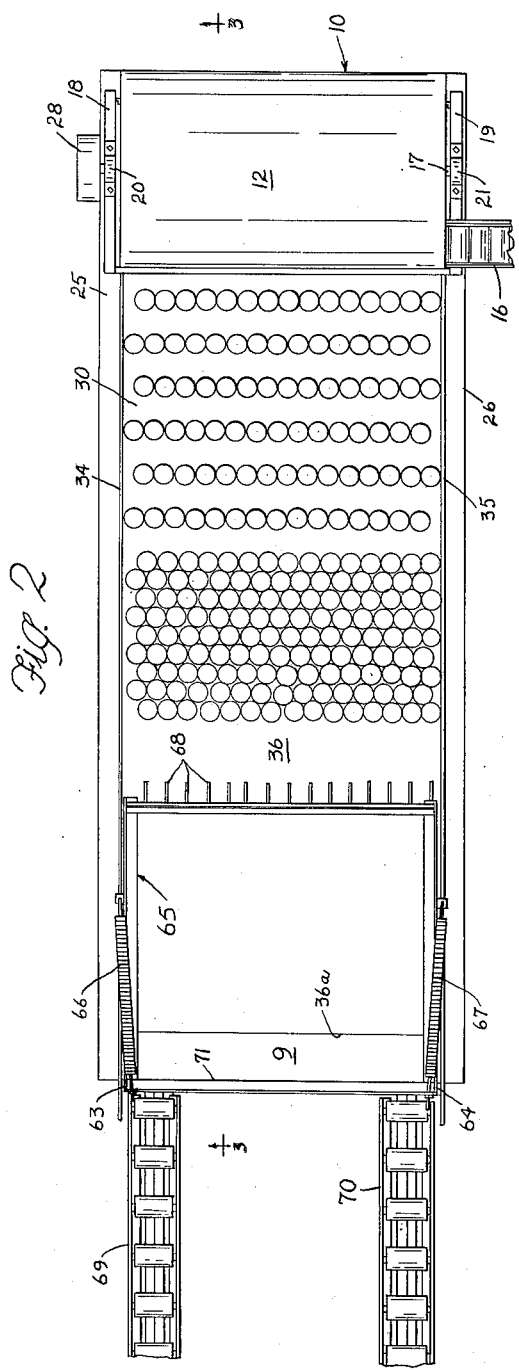
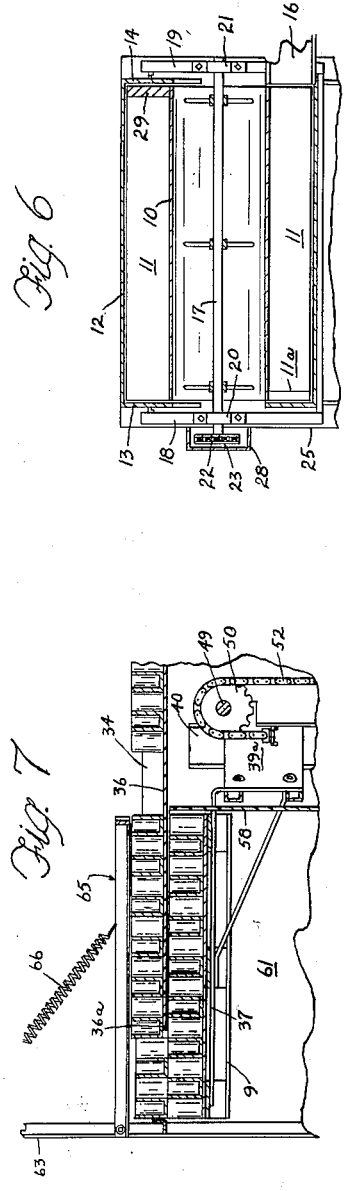
INVENTOR.
Lawrence B. McCoy
BY
atty.

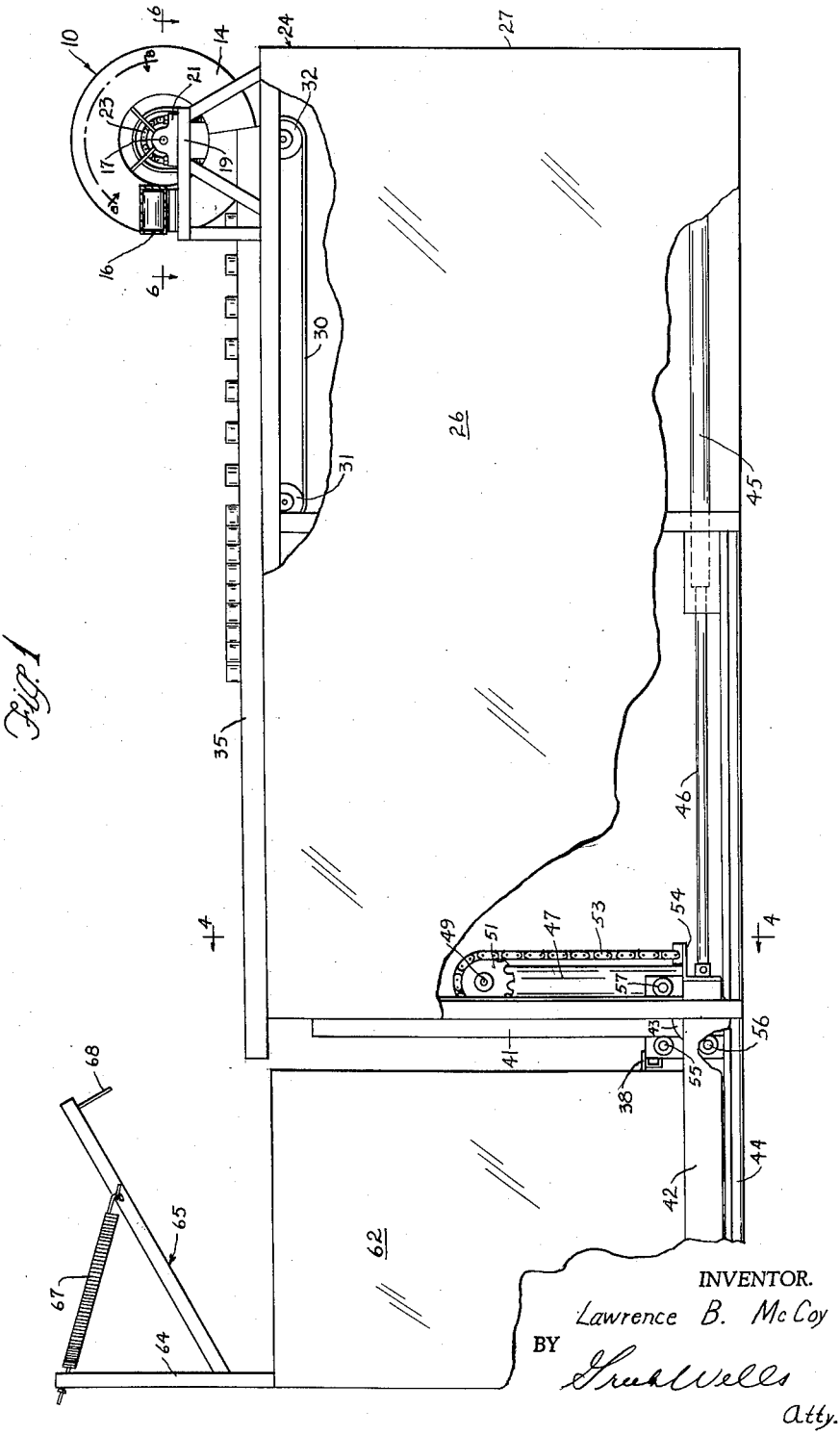

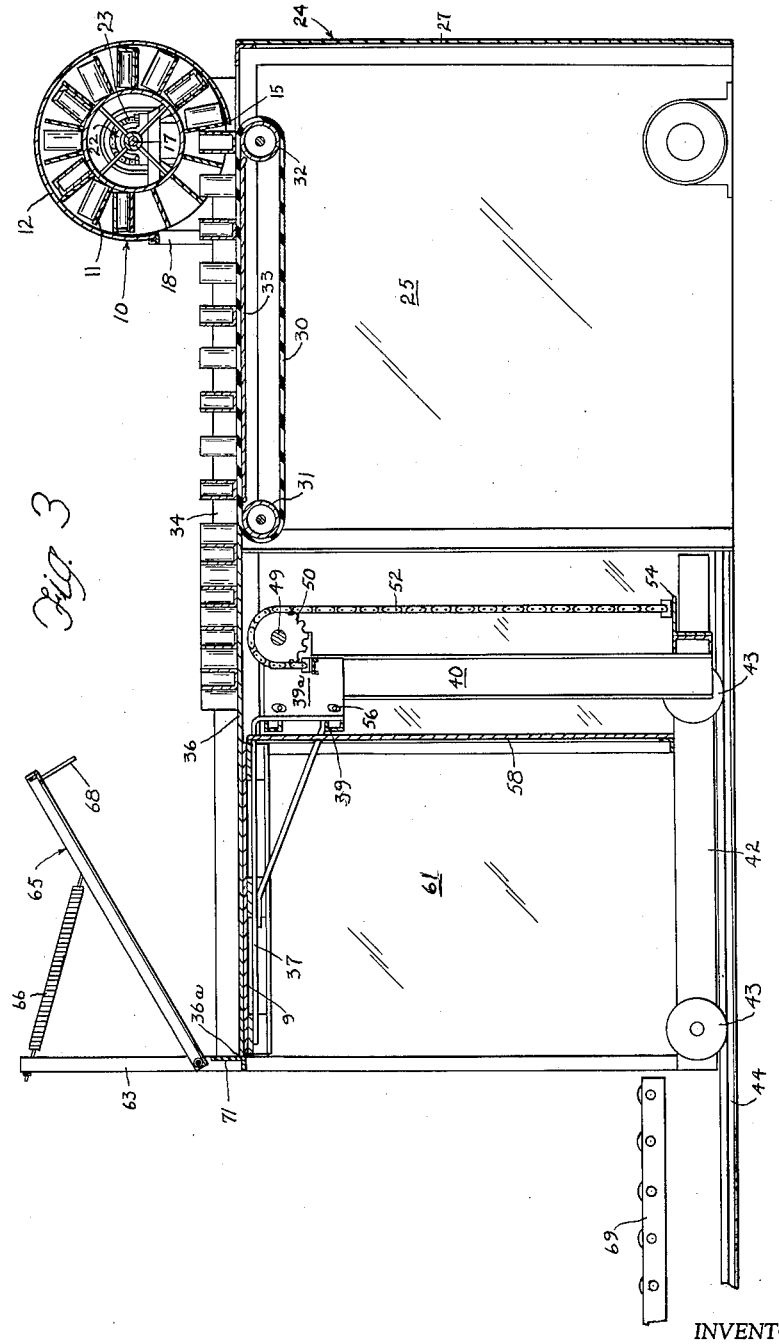

March 27, 1962 L. B. McCOY 3,027,020
PALLET PACKER
Filed Dec. 16, 1958 5 Sheets-Sheet 4
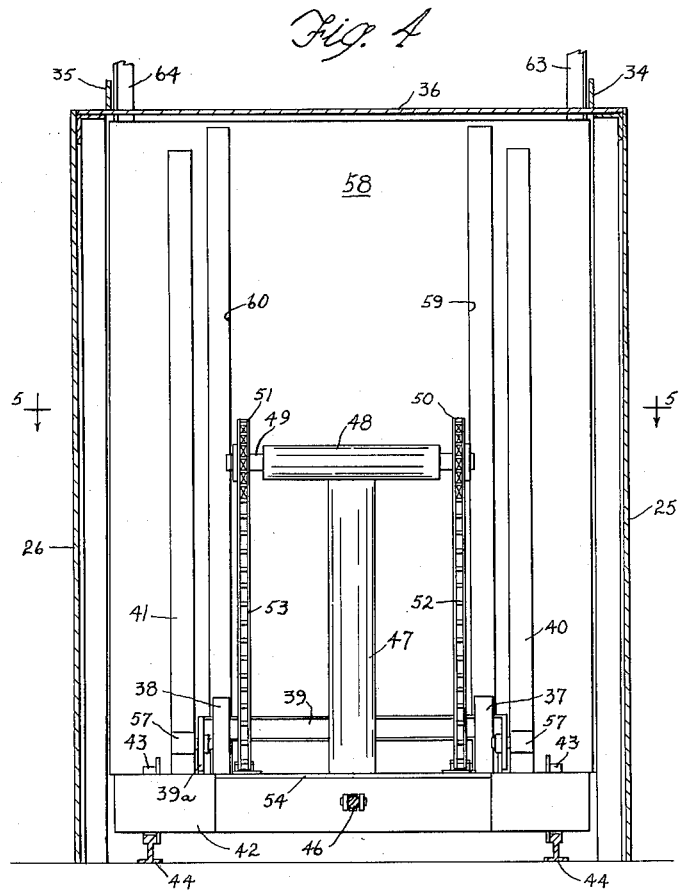
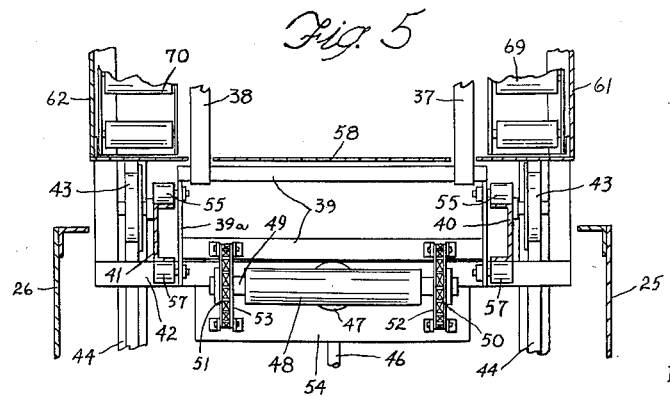
INVENTOR.
Lawrence B. McCoy
BY
Strublewells.
Atty.

March 27, 1962     L. B. McCOY     3,027,020

PALLET PACKER

Filed Dec. 16, 1958     5 Sheets-Sheet 5

INVENTOR.
Lawrence B. McCoy
BY
Atty.

United States Patent Office 3,027,020
Patented Mar. 27, 1962

3,027,020
PALLET PACKER
Lawrence B. McCoy, 330 Mullan Ave.,
Walla Walla, Wash.
Filed Dec. 16, 1958, Ser. No. 780,727
6 Claims. (Cl. 214—6)

This invention relates to a pallet packer. In the handling of containers of packages such as cans in canning plants and other places, it is desirable to place the containers on pallets so they can be transferred readily by lift trucks. It is the purpose of my invention to provide a novel means to receive containers from a continuous conveyor and arrange them upright in closely packed groups and load the groups as layers, one upon another, avoiding the necessity of withdrawing any support resting upon a lower layer and carrying an upper layer.

My invention is embodied in a machine having an endless collecting and aligning conveyor that receives the containers from a chute or other supply source and moves ahead step by step, arranging the containers in rows (and staggering the containers in adjacent rows where they are cylindrical) and then delivering the succeeding rows to a bunching conveyor which pushes the rows as they are delivered onto a platform. A pallet shifter and a sweep carried thereby periodically sweep a group of rows (enough to make a layer covering the pallet) onto a moving pallet, successively lowering the pallet as a layer is completed thereon.

More specific objects and advantages of the invention will appear from the following description and accompanying drawings wherein a preferred form of the invention is disclosed. It should be understood, however, that the drawings and description are illustrative only and that minor changes from the exact details shown and described may be made within the scope of the claims.

In the drawings:

FIGURE 1 is a view in side elevation of a pallet packer embodying my invention with certain parts broken away;

FIGURE 2 is a plan view of the pallet packer shown in FIGURE 1;

FIGURE 3 is a sectional view taken on the line 3—3 of FIGURE 2;

FIGURE 4 is a sectional view taken on the line 4—4 of FIGURE 1 on an enlarged scale;

FIGURE 5 is a fragmentary sectional view taken on the line 5—5 of FIGURE 4;

FIGURE 6 is a fragmentary sectional view taken on the line 6—6 of FIGURE 1;

FIGURE 7 is a fragmentary sectional view taken on the line 3—3 of FIGURE 2, but showing the parts in changed position;

Figure 8:
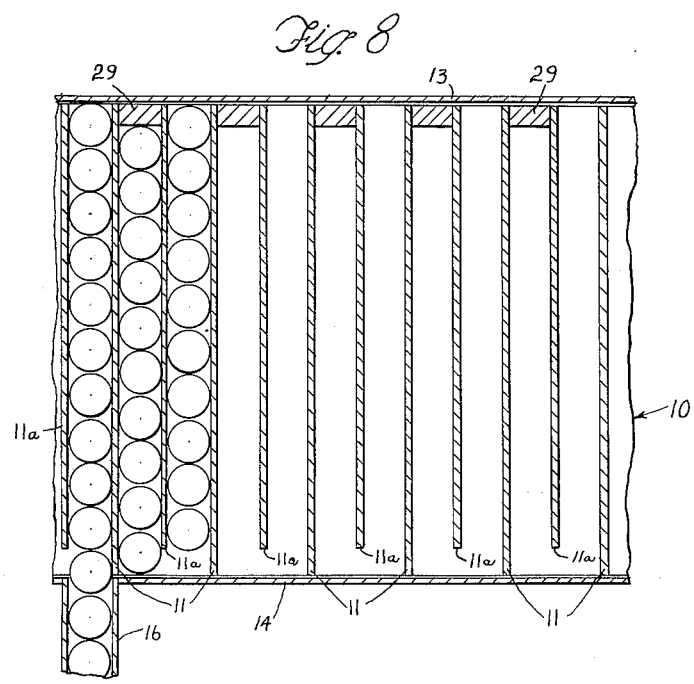
FIGURE 8 is an enlarged flattened sectional view taken on the line 8—8 of FIGURE 1.

Referring now to the drawings, my invention in arranging the containers in rows, utilizes a rotary conveyor in the form of a drum 10, having spaced paddles or partitions 11 projecting radially therefrom to provide a series of cells. A hood 12 having end portions 13 and 14, encircles the greater portion of the drum 10 and paddles 11, but is open between a point 15 below the drum 10 to a delivery chute 16 which is joined to the end portion 14 slightly below and at one side of the center shaft 17 which supports and drives the drum 10. The hood 12 is supported by standards 18 and 19 at the ends and these standards have bearings 20 and 21 for the shaft 17. A sprocket wheel 22 and a chain 23 are provided to drive the shaft 17 to rotate the drum 10 in the direction indicated.

A housing 24 supports the standards 18 and 19. It has side walls 25 and 26 and an end wall 27. A cover 28 for the drive means 22 and 23 is mounted on the side wall 25.

It is desirable to stagger cylindrical containers such as the cans commonly used for foods, when they are stacked on end in layers because more cans will occupy a given area of support. The row forming means including the drum 10, paddles 11 and hood 12, is adapted to stagger the rows of containers it forms. To accomplish this result, alternate paddles 11 are shortened at the receiving end and the space between paddles immediately behind the short paddle is shortened at the end remote from the discharge chute, by an amount substantially equal to one half the diameter of the cans being arranged in rows by the drum. The result of this arrangement is seen in FIGURE 8 of the drawings which shows the endless conveyor 10 flat and the containers arranged therein. It is to be noted that one paddle 11 has to be made short as indicated at 11a, in order to move past the container which is partially in the chute 16 and partly on the conveyor 10. The next row of containers will extend to the end of the next paddle 11, being held back by the block 29 which is located at the side of the conveyor 10 remote from the chute 16. Therefore the next container advancing from the chute 16 will be held back out of the path of the long paddles.

In the use of the row forming means just described, the drums 10 are made removable with their drive shaft and covers because different spacings between the paddles 11 and different sizes of blocks 29 and short paddles 11 are needed for different diameters of cans.

Figure 9:
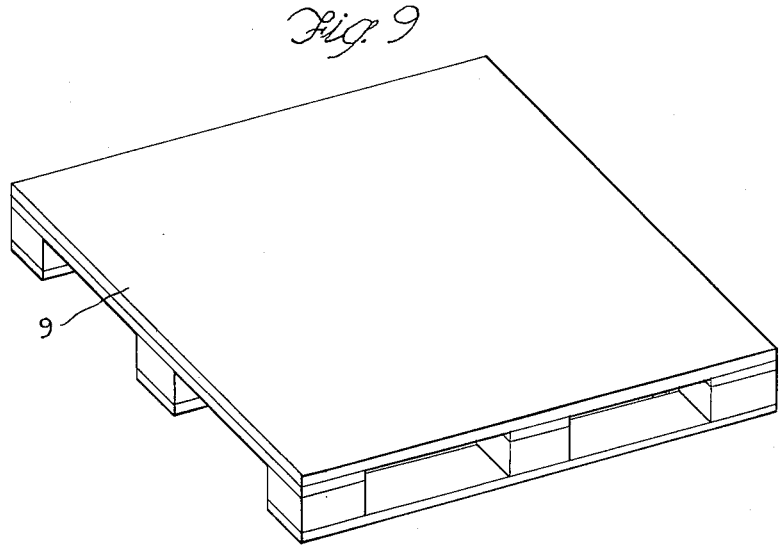
FIGURE 9 is a perspective view of a pallet used with my invention.

The containers are delivered onto a bunching conveyor 30 which is mounted by two rollers 31 and 32 and rides over a support plate 33 extending between the side walls 25 and 26. This conveyor moves the containers between guides 34 and 35 provided on top of the housing 24. When the containers reach the discharge end of the conveyor 30, they are pushed onto a platform 36 which extends across the housing 24 between the guides 34 and 35. Each row of containers delivered by the conveyor 30 to the platform 36 moves the preceding rows of containers on the platform 36 ahead. In this way a group of containers can be assembled on the platform 36 for loading as one layer on a pallet 9. Such a pallet is shown in FIGURE 9 of the drawings. These pallets are in common use so no detailed description of the pallet is believed to be necessary.

The pallet 9 is carried by lift forks 37 and 38 which are mounted on a cross frame 39 that is guided in a vertical movement by upright guides 40 and 41 on a carriage 42. The carriage 42 has wheels 43 that ride on rails 44 within the housing 24. The carriage 42 is reciprocated to and fro on the rails under control of the operator by means of a double acting hydraulic jack 45 mounted within the housing 24. The jack 45 has its piston rod 46 connected to the carriage 42.

The cross frame 39 is moved up and down on the carriage 42 under control of the operator by another hydraulic jack 47 which is mounted on the carriage 42 adjacent to the cross frame 39. The jack 47 has a cross head 48 on top of its piston rod. The cross head 48 mounts a shaft 49 having sprocket wheels 50 and 51 at its ends. Sprocket chains 52 and 53 are trained over the wheels 50 and 51. Each chain has one end fastened to the cross frame 39 and the other end fastened to a plate 54 on the end of the carriage 42. With this arrangement the forks 37 and 38 can be moved vertically a distance twice the vertical travel of the piston in the jack 47.

The cross frame 39 is guided on the upright guide channels 40 and 41 by end plates 39a on the cross frame. The cross frame 39 has two rollers 55 and 56 on the fork side of the respective guide 40 or 41 and one roller 57 on the other side of the guide. The carriage 42 has an upright wall 58 alongside the cross frame 39. The wall 58 has two vertical slots 59 and 60 therein through which the forks 37 and 38 extend over the carriage 42. The carriage also has side walls 61 and 62, but is open at the end opposite the wall 58 for discharge of the pallets 9.

Two upright posts 63 and 64 are provided at the opening of the carriage 42. These posts 63 and 64 have a sweep frame 65 pivoted thereon and extending over the housing 24 toward the bunching conveyor. The frame 65 is yieldingly supported in raised position by two springs 66 and 67 that extend diagonally from the posts 63 and 64 to the frame 65. The frame has depending fingers 68 at its free end that are adapted to drop behind a group of containers bunched on the platform 36 so as to slide the containers on the platform when the carriage 42 is moved away from the bunching conveyor 30.

Roller tracks 69 and 70 are provided at the discharge end of the housing 24 to receive the loaded pallet 9 from the forks 37 and 38 and to position a new pallet for lifting engagement by the forks 37 and 38.

The manner in which the containers are arranged in staggered rows by the drum 10, paddles 11 and blocks 29 has already been described. It is evident that the bunching conveyor 30 will bring the several rows together in a compact group on the platform 36. FIGURES 3 and 7 show how the containers are delivered onto the pallet 9 in such a manner that they have no sliding movement relative to the pallet. This is an important feature of the present machine. The pallet and the group of containers being placed thereon are moving together in a horizontal direction during the transfer of the containers to the pallet. The only movement of the containers relative to the pallet is a slight drop from the edge of the platform 36. The containers are held upright during this drop by a stop bar 71 on the carriage 42 between the upright posts 63 and 64. In some cases the groups of containers on the pallet 9 may be separated by a thin sheet which is laid on each group of containers after the group is placed on the pallet 9. Such a sheet helps to hold the containers in place and prevents those at the edges of the stack from falling out.

Assuming that the machine is used to load containers, such as the cans illustrated upon pallets 9, the operation is as follows:

The cans are delivered to the row forming means by the chute 16. When a cell between the paddles 11 and 11a is filled, the conveyor 10 is moved ahead one cell width and the cans from chute 16 fill the next cell. Due to the arrangement of the paddles 11 and 11a and the blocks 29, the cans in each row in a cell will be offset lengthwise of the drum 10 an amount equal to one-half the can diameter from the cans in the adjacent rows.

When the first row of cans so formed arrives at the bottom position with respect to the conveyor 10, they move down past the edge of the cover or hood 12 onto the bunching conveyor 30. This conveyor maintains the staggered relation of the rows and moves them along horizontally to the platform 36. Here the rows are pushed together by the rows following from the conveyor 30.

While the cans are being bunched on the platform 36, the operator uses the carriage 42 and the forks 37 and 38 to bring a pallet 9 into position to receive a layer of cans. The jack 45 is operated to move the carriage 42 from the position shown in FIGURE 1 to that shown in FIGURE 3. He also uses the jack 47 to lift the forks 37 and 38 and cross frame 39 up to bring the top of the pallet 9 into proximity to the lower surface of the platform 36 so that the load receiving surface of the pallet 9 is below the can supporting surface of the platform 36 a minimum amount.

Next the operator lowers the sweep frame 65, bringing the fingers 68 into position between container walls so that the cans between the fingers 68 and the end edge 36a of the platform 36 will have to slide on the platform 36 when the carriage 42 is moved away from the platform. Next the operator uses the jack 45 to move the carriage 42 out from beneath the platform 36. As the carriage 42 is moved, the cans on the platform are pushed over the edge 36a and drop to the surface of the pallet 9 until the entire group captured by the fingers 68 are transferred to the pallet 9. It should be noted that the carriage 42 has a stop means 71 which keeps the cans from going beyond the posts 63 and 64.

When the first group of cans is transferred to the pallet, the pallet is lowered the depth of a row of cans, a sheet is applied, if desired, over the cans on the pallet and the pallet is returned to bring the stop 71 against the edge 36a of the platform 36. As soon as the cans on the platform 36 are pushed to the edge 36a of the platform 36, the operator again lowers the sweep frame 65 and starts the carriage in movement away from the platform 36. FIGURE 7 of the drawings shows a second tier or group of cans being laid on the pallet 9.

When a pallet is loaded it is lowered by the forks 37 and 38 onto the roller tracks 69 and 70 so that it can be pushed away to allow another pallet to be placed over the forks 37 and 38.

It is believed that the nature and advantages of my invention will be apparent from the foregoing description.

Having described my invention, I claim:

1. A pallet packer for stacking layers of individual packages upon a pallet comprising a package collecting and row forming conveyor, a platform adjacent to the conveyor, means to transfer rows of packages from said conveyor onto said platform, and move them along the platform, the platform having an end discharge edge, a pallet carrying carriage movable between a position beneath the platform and a position beyond the end edge of the platform, lift means on the carriage operable to lift a pallet thereon up to the bottom of the platform and to support the pallet at intermediate levels below the platform, and a sweep frame on the carriage above the platform having fingers lowerable behind packages on the platform to drag them from the platform onto the pallet as the carriage is moved from beneath the platform.

2. The invention defined in claim 1 wherein said first named means comprises a bunching conveyor beneath the row forming conveyor and level with the platform.

3. The invention defined in claim 1 wherein the row forming conveyor includes means to stagger succeeding rows of packages thereon endwise of the rows.

4. The invention defined in claim 1 wherein the lift means comprises a cross frame on the carriage having lift forks receiving the pallet, and hydraulic means to lift and lower the cross frame.

5. In a pallet packer, a row forming apparatus comprising package feed means adapted to supply packages in a continuous row, package receiving means, a rotary conveyor located transversely above said package receiving means and directly adjacent thereto, said rotary conveyor comprising a fixed cylindrical hood having integral ends, one of said ends having an aperture cut therein in alignment with the output end of said package feed means, said hood having an arcuate aperture across its width from a line tangential to said package receiving means to an elevation above said package receiving means equal to the height of the packages, a coaxial drum rotatably mounted within said hood and extending across the inner width of said hood between its ends, drive means operatively connected to said drum adapted to rotate said drum about its axis, a plurality of longitudinal paddles fixed to the outer surface of said drum extending radially outward in the space between the radii of the drum and hood, said paddles being of long and short lengths arranged alternately about the circumference of said drum, each of said paddles being mounted on said drum in alignment with the end of said drum spaced from the apertured end of said hood, and block means fixed to said drum at the last named end thereof, said block means being positioned intermediate each short paddle and the succeeding long paddle in the direction of rotation of said drum, said block means including a face located from said last named end of said drum a distance equal to the difference in length between the long paddles and the short paddles.

6. A pallet packer operable to stack layers of like packages upon a pallet comprising a platform having an exposed end edge, a reciprocable pallet supporting carriage movable beneath said end edge between a position where the platform extends over a pallet on the carriage and a position where the pallet is out from under the platform, said carriage being provided with a package stop thereon parallel to the end edge of the platform and at the level thereof, lift means on the carriage operable to lift a pallet thereon up to the bottom of the platform, and sweep means on the carriage above the platform mounted for reciprocating motion only as a unit with said carriage operable to sweep packages on the platform over said end edge on to the pallet as the carriage is moved from said first named position toward the second named position.

References Cited in the file of this patent
UNITED STATES PATENTS

| | | |
|---|---|---|
| 1,399,528 | Sommers | Dec. 6, 1921 |
| 1,414,998 | Allen | May 2, 1922 |
| 2,619,237 | Socke | Nov. 25, 1952 |
| 2,884,114 | Oberwelland | Apr. 28, 1959 |
| 2,979,872 | Verrinder | Apr. 18, 1961 |